US009535580B2

(12) United States Patent
Takeda et al.

(10) Patent No.: US 9,535,580 B2
(45) Date of Patent: Jan. 3, 2017

(54) DISPLAY APPARATUS AND COMPUTER-READABLE NON-TRANSITORY RECORDING MEDIUM WITH DISPLAY CONTROL PROGRAM STORED THEREON

(71) Applicant: KYOCERA Document Solutions Inc., Osaka (JP)

(72) Inventors: Hideki Takeda, Osaka (JP); Takashi Namii, Osaka (JP); Yumi Hirobe, Osaka (JP)

(73) Assignee: KYOCERA Document Solutions Inc., Tamatsukuri, Chou-ku, Osaka (JP)

( * ) Notice: Subject to any disclaimer, the term of this patent is extended or adjusted under 35 U.S.C. 154(b) by 26 days.

(21) Appl. No.: 14/606,303

(22) Filed: Jan. 27, 2015

(65) Prior Publication Data

US 2015/0212611 A1 Jul. 30, 2015

(30) Foreign Application Priority Data

Jan. 29, 2014 (JP) ................................. 2014-014407

(51) Int. Cl.
*G06F 3/041* (2006.01)
*G06F 3/044* (2006.01)
(Continued)

(52) U.S. Cl.
CPC ........... *G06F 3/0484* (2013.01); *G06F 3/0488* (2013.01); *G06F 2203/04104* (2013.01); *G06F 2203/04808* (2013.01)

(58) Field of Classification Search
CPC ............ G06F 2203/04104; G06F 2203/04808; G06F 3/0484; G06F 3/0488
See application file for complete search history.

(56) References Cited

U.S. PATENT DOCUMENTS

2005/0128527 A1* 6/2005 Brawn ............... H04N 1/00413
358/401
2006/0026521 A1* 2/2006 Hotelling .............. G06F 3/0418
715/702

(Continued)

FOREIGN PATENT DOCUMENTS

JP 2013-012060 1/2013

*Primary Examiner* — Ariel Balaoing
(74) *Attorney, Agent, or Firm* — IP Business Solutions, LLC

(57) ABSTRACT

An information processing apparatus includes a display section, a control section, a first movement information detecting section configured to detect an amount of movement from an initial point to a primary stopping point of an operator's index finger touching a touch panel; a second movement information detecting section configured to detect an amount of movement from an initial point to a primary stopping point of an operator's thumb touching the touch panel; an amount-of-value-change calculating section configured to calculate, from the amount of movement of the index finger, an amount of numerical value change at each numerical display switch; and a switching speed calculating section configured to calculate, from the amount of movement of the thumb, a switching speed at each numerical display switch. The control section allows the numerical display switch of the display section in the calculated amount of numerical value change at the calculated switching speed.

9 Claims, 17 Drawing Sheets

(51) Int. Cl.
  *G06F 3/0484* (2013.01)
  *G06F 3/0488* (2013.01)

(56) References Cited

U.S. PATENT DOCUMENTS

2008/0304768 A1* 12/2008 Yamashita ......... H04N 1/00408
                                                  382/298
2011/0136543 A1*  6/2011 Lan ..................... G06F 1/1626
                                                  455/566
2013/0097551 A1*  4/2013 Hogan ................ G06F 3/04847
                                                  715/780

* cited by examiner

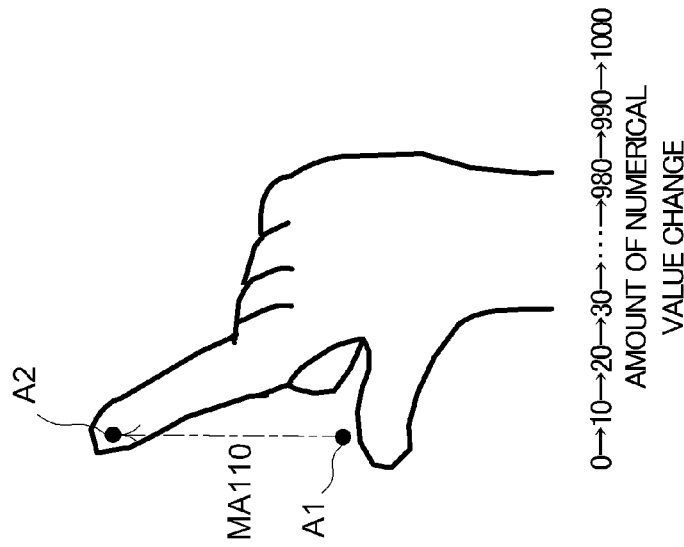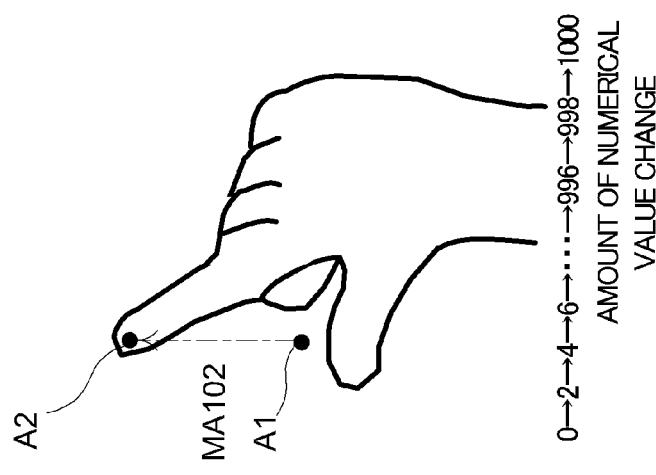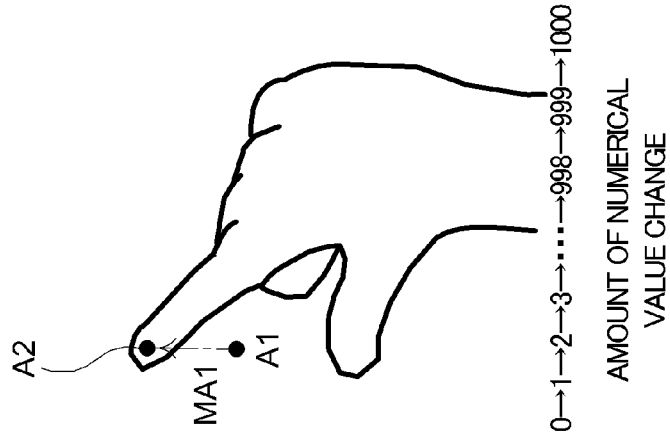

0→1→2→3→…→998→999→1000
AMOUNT OF NUMERICAL VALUE CHANGE

0→2→4→6→…→996→998→1000
AMOUNT OF NUMERICAL VALUE CHANGE

0→10→20→30→…→980→990→1000
AMOUNT OF NUMERICAL VALUE CHANGE

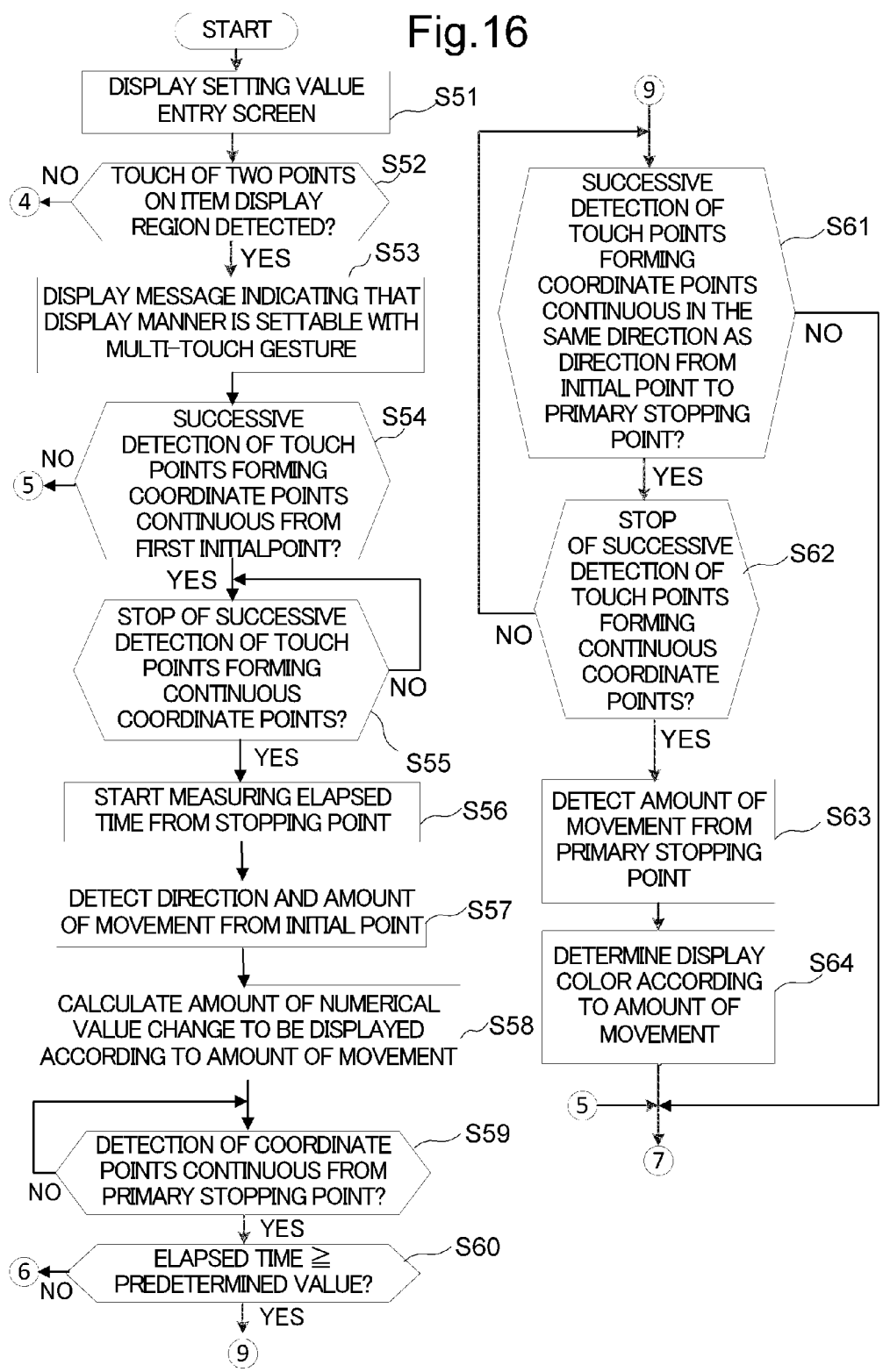

DISPLAY APPARATUS AND COMPUTER-READABLE NON-TRANSITORY RECORDING MEDIUM WITH DISPLAY CONTROL PROGRAM STORED THEREON

INCORPORATION BY REFERENCE

This application claims priority to Japanese Patent Application No. 2014-14407 filed on Jan. 29, 2014, the entire contents of which are incorporated by reference herein.

BACKGROUND

The present disclosure relates to a display apparatus and a display control program and particularly relates to a technique for displaying one after another of numerical values on a display section.

Image forming apparatuses, mobile terminals such as smartphones, personal computers, and like devices and apparatuses display on their display section candidates for a setting value, which can be set by operators, for a function or the like operable on these devices and apparatuses and receive entry of a desired setting value using a touch panel function or the like through an operator's touch of a display screen. These devices and apparatuses switch a display of numerical values enterable as a setting value from one value to another in succession to enable the operator to readily select a desired setting value. For example, when, for enterable numerical values of 1 to 1000, the operator enters a command to switch the numerical display from one value to another in succession, the numerical values are displayed one after another in an amount of numerical value change of 1, like 1→2→3→ . . . →998→999→1000.

Furthermore, when during this successive display switches the operator is slow in selecting a value, the amount of numerical value change at subsequent display switches is increased. For example, when the operator is slow in selecting a value while the successive display switches are made in an amount of numerical value change of 1 in the above manner, the numerical values are displayed differently on the way one after another in an amount of numerical value change of 10, like . . . →50→60→70→80→90→100. Thus, a desired value to be selected by the operator can be reached quickly.

SUMMARY

A technique improved over the aforementioned technique is proposed as one aspect of the present disclosure.

A display apparatus according to an aspect of the present disclosure includes a display section, a display control section, an operating point detecting section, a number-of-points detecting section, a first movement information detecting section, a second movement information detecting section, an amount-of-value-change calculating section, and a switching speed calculating section.

The display section is configured to display an image.

The display control section is configured to control a display operation of the display section.

The operating point detecting section is configured to detect an operating point where an operator has performed an operation on a display screen of the display section.

The number-of-points detecting section is configured to detect whether or not two operating points has been substantially concurrently detected by the operating point detecting section.

The first movement information detecting section is configured, when the two operating points are detected by the number-of-points detecting section, operating points forming coordinate points continuous from an initial point which is one of the two detected operating points are successively detected by the operating point detecting section, and the successive detection of the operating points is then stopped, to detect first movement information indicating an amount of movement from the initial point to a primary stopping point where the successive detection is stopped.

The second movement information detecting section is configured, when the two operating points are detected by the number-of-points detecting section, operating points forming coordinate points continuous from an initial point which is the other of the two detected operating points are successively detected by the operating point detecting section, and the successive detection of the operating points is then stopped, to detect second movement information indicating an amount of movement from the initial point to a primary stopping point where the successive detection is stopped.

The amount-of-value-change calculating section is configured to calculate, from the amount of movement detected by the first movement information detecting section, an amount of numerical value change at each display switch made so that the display control section allows the display section to switch a display from one to another of a plurality of numerical values in succession in increasing or decreasing order.

The switching speed calculating section is configured to calculate, from the amount of movement detected by the second movement information detecting section, a switching speed at each display switch made so that the display control section allows the display section to switch the display from one to another of the plurality of numerical values in succession in the amount of numerical value change.

The display control section is further configured to allow the display section to switch the display from one to another of the plurality of numerical values in succession in the calculated amount of numerical value change and use the calculated switching speed as the switching speed at the display switch from one to another of the plurality of numerical values.

Furthermore, in a computer-readable non-transitory recording medium with a display control program stored thereon according to another aspect of the present disclosure, the display control program allows a computer to function as the aforementioned display control section, the aforementioned operating point detecting section, the aforementioned number-of-points detecting section, the aforementioned first movement information detecting section, the aforementioned second movement information detecting section, the aforementioned amount-of-value-change calculating section, and the aforementioned switching speed calculating section.

BRIEF DESCRIPTION OF THE DRAWINGS

FIGS. 7A, 7B, and 7C are views showing states where an operator's index finger is slid in different amounts of sliding movement.

FIG. 16 is a flowchart showing a third embodiment of display control in the information processing apparatus.

DETAILED DESCRIPTION

Figure 1:
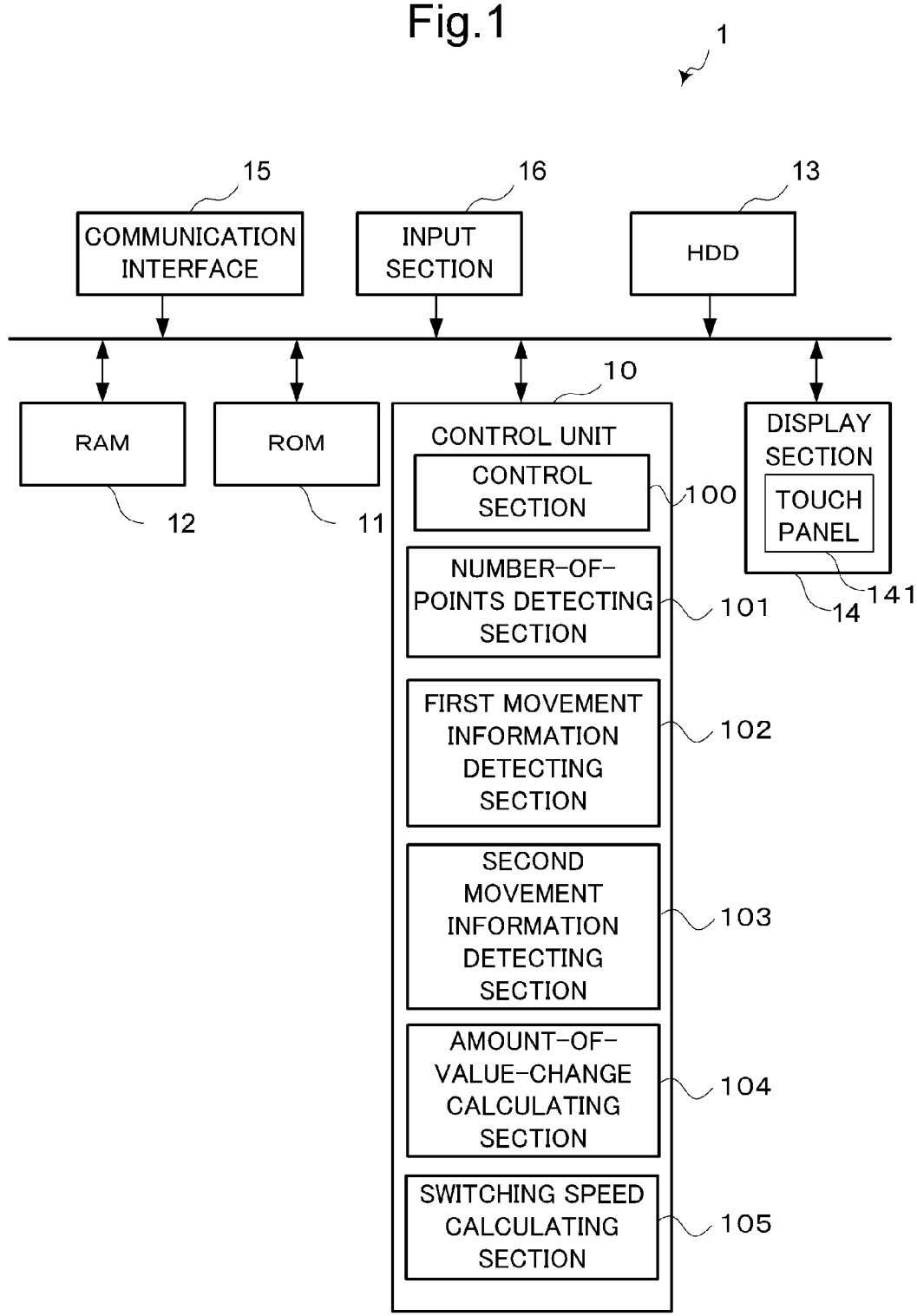
FIG. 1 is a block diagram schematically showing an internal architecture of an information processing apparatus serving as a display apparatus according to a first embodiment of the present disclosure.

Hereinafter, a description will be given of a display apparatus and a display control program, both according to one embodiment of the present disclosure, with reference to the drawings. FIG. 1 is a block diagram schematically showing an internal architecture of an information processing apparatus serving as the display apparatus according to the one embodiment of the present disclosure.

The information processing apparatus 1 serving as the display apparatus according to the one embodiment of the present disclosure includes a control unit 10, a ROM 11, a RAM 12, an HDD 13, a display section 140, a communication interface 15, and an input section 16. These unit and sections can transfer data or signals to and from one another via a CPU bus.

The control unit 10 is formed of a CPU or the like and configured to govern the overall operation of the information processing apparatus 1. The ROM 11 stores an operating program on basic operations of the information processing apparatus 1. The RAM 12 is used as an operating region of the control unit 10 and for other purposes.

The HDD 13 can store, in part of its storage region, various types of data including text data and image data to be printed. The HDD 13 stores the display control program according to the one embodiment of the present disclosure. The control unit 10 operates in accordance with the display control program to function as a control section 100 (only for functions associated with the display control), a number-of-points detecting section 101, a first movement information detecting section 102, a second movement information detecting section 103, an amount-of-value-change calculating section 104, and a switching speed calculating section 105. Alternatively, each of the control section 100 (only for functions associated with the display control), the number-of-points detecting section 101, the first movement information detecting section 102, the second movement information detecting section 103, the amount-of-value-change calculating section 104, and the switching speed calculating section 105 of the control unit 10 may not be implemented by the operation of the control unit 10 in accordance with the display control program but may be constituted by a hardware circuit. Hereinafter, the same applies to the other embodiments unless otherwise stated.

The display 14 is formed of an LCD (liquid crystal display) or the like and displays contents of various data, and operation guidance and the like for the operator operating the information processing apparatus 1. The communication interface 15 serves as an interface for data communication with multifunction peripherals, personal computers, and so on connected over a network.

The display section 14 is provided with a touch panel 141. The touch panel 141 is provided as a display screen of the display section 14 and configured to detect an operator's touch of the display screen together with a touch point (coordinate point). When detecting the operator's touch, the touch panel 141 outputs a detection signal indicating the touch point to the control section 100, the number-of-points detecting section 101, the first movement information detecting section 102, the second movement information detecting section 103, and so on.

When the operator slides his/her finger on the display screen of the display section 14 while keeping it in touch with the display screen, the touch panel 141 outputs to the control section 100 detection signals indicating a series of points of movement from an initial point at which the touch has been first detected to a latest position at which the touch is last detected. Furthermore, when the operator touches the display screen of the display section 14 with his/her two fingers substantially concurrently, the touch panel 141 detects the respective touch points of the two fingers. Thus, a multi-touch operation can be performed based on the detection signals from the touch panel 141. The touch panel 141 is an example of the operating point detecting section defined in "What is claimed is". The touch panel 141 encompasses a touch panel operable to detect an operator's finger or the like when the operator's finger or the like, even if not touching the display screen, comes within a certain small distance of the display screen. Therefore, the term "touch" used in this embodiment includes a state where a finger or the like coming within the certain small distance of the display screen is detected, without an actual touch of the display screen, by the function of the touch panel 141, with the consideration of this state as a substantial touch. The "touch point" in this embodiment is an example of the operating point defined in "What is claimed is".

The input section 16 is formed of a keyboard, a mouse or the like, through which various operation commands are entered into the information processing apparatus 1 by the operator. For example, a command to print a document is entered on the input section 16.

The control unit 10, as described previously, includes the control section 100, the number-of-points detecting section 101, the first movement information detecting section 102, the second movement information detecting section 103, the amount-of-value-change calculating section 104, and the switching speed calculating section 105.

The control section 100 governs the overall operation control of the information processing apparatus 1.

The number-of-points detecting section 101 is configured to detect, based on the detection signals from the touch panel 141, whether or not two touch points has been substantially concurrently detected by the touch panel 141.

The first movement information detecting section 102 is configured, when two touch points are detected by the number-of-points detecting section 101, touch points forming coordinate points continuous from an initial point which is one of the two detected touch points are successively detected by the touch panel 141, and the successive detection of the touch points is then stopped with the detection of a stopping point (primary stopping point), to detect an amount of movement from the initial point to the primary stopping point based on the detection signals acquired from the touch panel 141.

The second movement information detecting section 103 is configured, when the two touch points are detected by the number-of-points detecting section 101, touch points forming coordinate points continuous from an initial point which is the other of the two detected touch points are successively detected by the touch panel 141, and the successive detection of the touch points is then stopped with the detection of a stopping point (primary stopping point), to detect an amount of movement from the initial point to the primary stopping point based on the detection signals acquired from the touch panel 141.

The amount-of-value-change calculating section 104 is configured to calculate, from the amount of movement detected by the first movement information detecting section 102, an amount of numerical value change at each display switch made so that the control section 100 allows the display section 14 to switch a display from one to another of a plurality of numerical values in succession in increasing or decreasing order.

The switching speed calculating section 105 is configured to calculate, from the amount of movement detected by the second movement information detecting section 103, a switching speed at each display switch made so that the control section 100 allows the display section 14 to switch the display from one to another of the plurality of numerical values in succession in the calculated amount of numerical value change.

The control section 100 is configured to serve as the display control section defined in "What is claimed is" to control a display operation of the display section 14. The control section 100 is further configured to allow the display section 14 to switch the display from one to another of the plurality of numerical values in succession in increasing or decreasing order. Specifically, the control section 100 is configured to allow the display section 14 to switch the display from one to another of the numerical values as display objects in succession in the amount of numerical value change calculated by the amount-of-value-change calculating section 104, using the switching speed calculated by the switching speed calculating section 105 as the switching speed at the display switch from one to another of the numerical values.

For example, when, in displaying one after another of numerical values of 0 to 1000, the control section 100 switches the numerical display in increments of 1, like 0→1→2→3→ . . . →998→999→1000, the amount of numerical value change is 1.

For another example, when, in displaying one after another of numerical values of 0 to 1000, the control section 100 switches the numerical display in increments of 10, like 0→10→20→ . . . →980→990→1000, the amount of numerical value change is 10.

The switching speed used herein refers to the time taken, when the control section 100 switches the display from one to another of a plurality of numerical values in succession in the amount of numerical value change, to change from the value just displayed to the next value to be displayed, in other words, a display period during which one of the plurality of numerical values as display objects is displayed.

Figure 2:
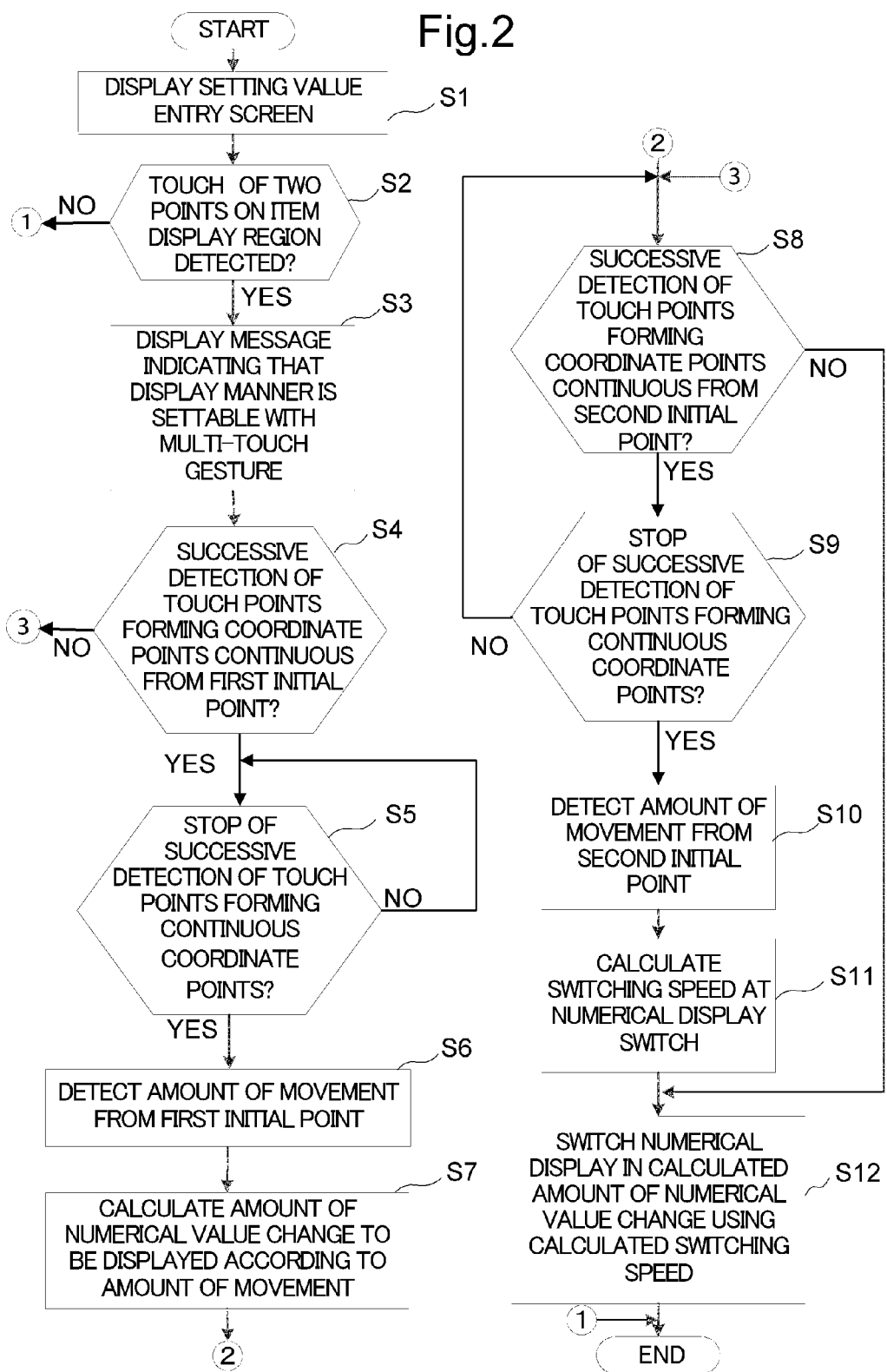
FIG. 2 is a flowchart showing a first embodiment of display control in the information processing apparatus.
Figure 3:
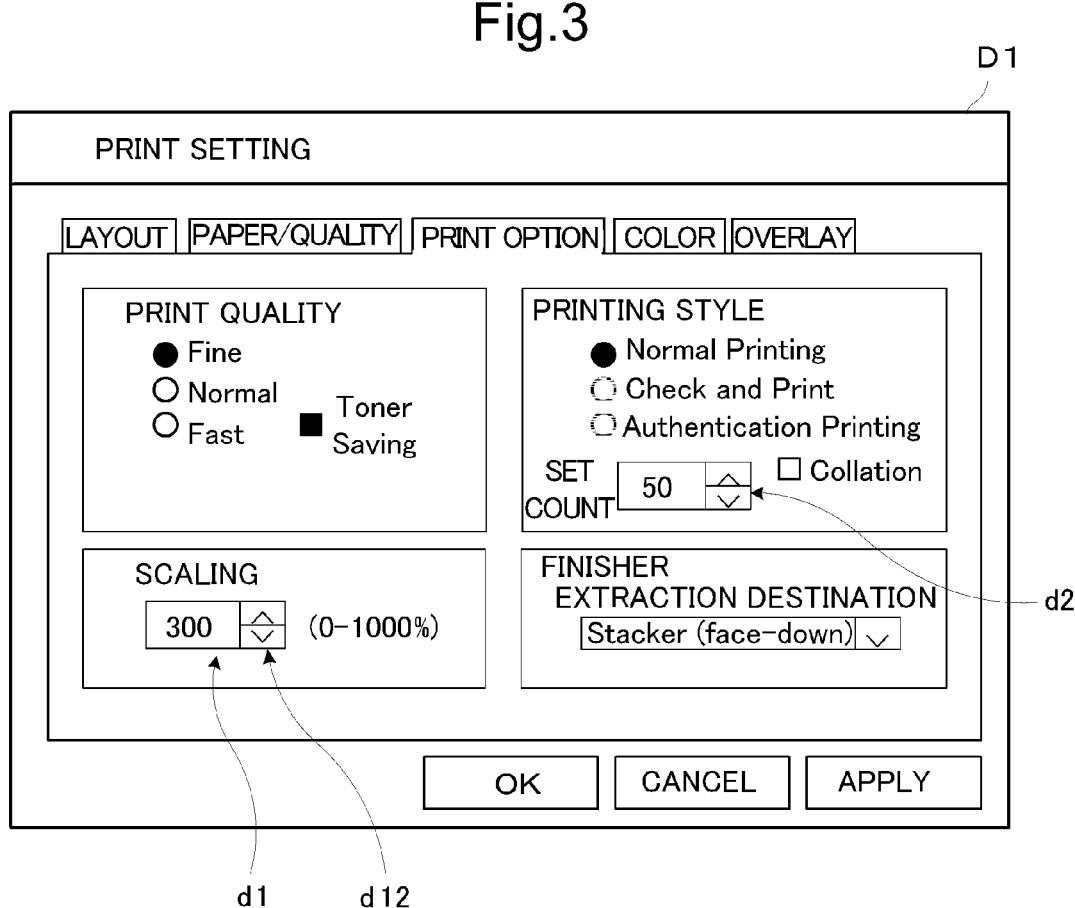
FIG. 3 is a view showing an example of a display screen of a display section.

Next, a description will be given of a first embodiment of display control over the display section 14 in the information processing apparatus 1. FIG. 2 is a flowchart showing the first embodiment of display control in the information processing apparatus 1. FIG. 3 is a view showing an example of a display screen of the display section 14.

When, with a word processor or like software run on the information processing apparatus 1, the operator enters a command to print a document on the input section 16, the control section 100 runs a printer driver based on this print command. The display section 14 displays, under the display control of the control section 100, a print setting screen D1 as shown in FIG. 3 (S1).

This print setting screen D1 includes a scaling factor setting image display region d1 for use in specifying the scaling factor of a print image and/or a set count setting image display region d2 for use in specifying the number of copy sets. The scaling factor setting image display region d1 displays an image for use in receiving from the operator entry of an enlargement or reduction factor as a setting value for the function of scaling a print image which is one of operable functions possessed by the information processing apparatus 1. The set count setting image display region d2 displays an image for use in receiving from the operator entry of a setting value for the function of setting the number of copy sets which is also one of operable functions possessed by the information processing apparatus 1. In other words, the print setting screen D1 is a setting value entry screen for use in receiving entry of setting values for these functions.

When, with the print setting screen D1 displayed on the display section 14, the operator touches, for example, the scaling factor setting image display region d1 with his/her finger, the touch panel 141 detects a coordinate point on the display screen corresponding to the operator's touch point. If the detected coordinate point coincides with a coordinate point previously stored as the coordinate point of the scaling factor setting image display region d1, the control section 100 detects that the operator has touched the scaling factor setting image display region d1.

When the operator's touch of a region displaying an image for receiving entry of a setting value for a function (the scaling factor setting image display region d1 in this case) has been detected in the above manner, the number-of-points detecting section 101 detects whether or not the number of the detected touch points is two (S2).

Figure 4:
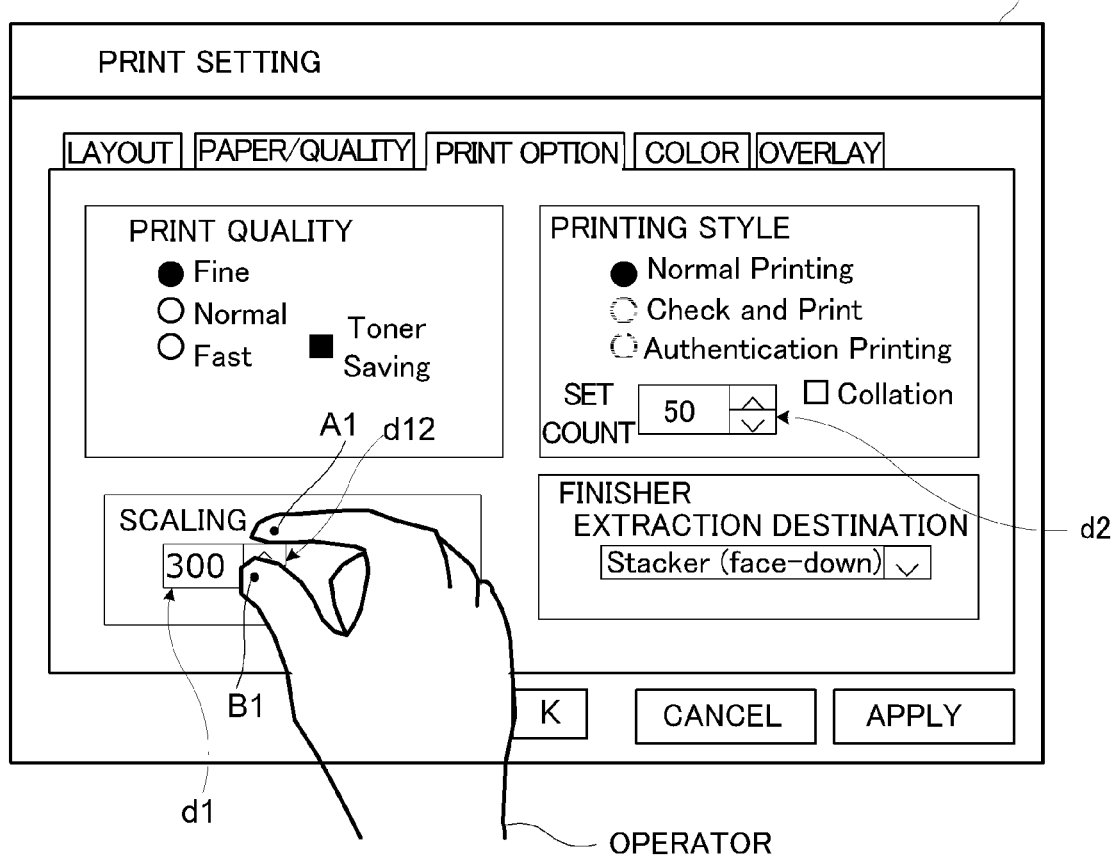
FIG. 4 is a view showing the example of the display screen of the display section.

When the number-of-points detecting section 101 detects that the number of the detected touch points is two (YES in S2), the control section 100 allows the display section 14 to display a message indicating that the amount of numerical value change and the switching speed in switching a numerical display of numerical values representing the setting value can be set by an operator's multi-touch gesture on the display screen (S3). For example, when the operator touches the scaling factor setting image display region d1 with his/her two fingers in the manner shown in FIG. 4, the control section 100 allows the display section 14 to display a message screen D2 in the form of a popup window, as shown as an example in FIG. 5, on the print setting screen D1. The control section 100 allows the display section 14 to stop the display of the message screen D2 after the elapse of a predetermined time (for example, five seconds). If NO in S2, the process ends.

Meanwhile, the first movement information detecting section 102 stores as a first initial point the coordinate point corresponding to one of the two touch points detected in S2. For example, when the operator touches the display screen with his/her thumb and index finger, the first movement information detecting section 102 stores as a first initial point the coordinate point corresponding to the touch point of the index finger. For example, the first movement information detecting section 102 considers the greater in y-coordinate (the vertically upper) of the two touch points detected in S2 to be the first initial point where the index finger touches the display screen. Then, when the operator slides his/her index finger placed on the first initial point in any direction while keeping it in touch with the display screen of the display section 14, the touch panel 141 outputs, to the first movement information detecting section 102, respective detection signals indicating touch points changing with time according to the index finger's movement.

On the other hand, the second movement information detecting section 103 stores as a second initial point the coordinate point corresponding to the other of the two touch points detected in S2, the other touch point being different from the one to be detected by the first movement information detecting section 102. In this example, the second movement information detecting section 103 stores as a second initial point the coordinate point corresponding to the touch point of the thumb. For example, the second movement information detecting section 103 considers the smaller in y-coordinate (the vertically lower) of the two touch points detected in S2 to be the second initial point where the thumb touches the display screen. Then, when the operator slides his/her thumb placed on the second initial point in any direction while keeping it in touch with the display screen of the display section 14, the touch panel 141 outputs, to the second movement information detecting section 103, respective detection signals indicating touch points changing with time according to the thumb's movement.

Then, the first movement information detecting section 102 determines whether or not the coordinate points corresponding to the touch points of the index finger indicated by the detection signals acquired from the touch panel 141 are coordinate points continuous (connected in series) from the first initial point (S4). If NO in S4, the process proceeds to S8 to be described hereinafter.

While it is successively determined that the coordinate points corresponding to the touch points indicated by the detection signals are such continuous coordinate points as described above (YES in S4), the first movement information detecting section 102 continues to determine whether or not the receipt of detection signals indicating the above continuous coordinate points is continued (NO in S5).

When the receipt of detection signals indicating the above continuous coordinate points is terminated, for example, if the first movement information detecting section 102 determines that the detection of touch points indicating the above coordinate points continuous from the first initial point has finished (YES in S5), responding that the operator has stopped the sliding of his/her index finger from the first initial point, the first movement information detecting section 102 detects the amount of movement from the first initial point to a primary stopping point which is the last touch point where the sliding has been stopped, based on the coordinate points corresponding to the first initial point and primary stopping point indicated by the detection signals (S6).

Subsequently, the amount-of-value-change calculating section 104 calculates an aforementioned amount of numerical value change according to the amount of movement MA1 of the index finger detected in S6 (S7). The amount-of-value-change calculating section 104 previously stores, for example, various amounts of movement and their associated amounts of numerical value change in a correspondence relation in the form of a data table. The amount-of-value-change calculating section 104 calculates the amount of numerical value change by reading this value associated with the detected amount of movement from the data table. Alternatively, the amount-of-value-change calculating section 104 may previously store respective factors associated with the various amounts of movement and calculate the amount of numerical value change using the factor associated with the detected amount of movement.

For example, the amount-of-value-change calculating section 104 calculates the amount of numerical value change in proportion to a change in the amount of movement MA1 detected in S6. In other words, the amount-of-value-change calculating section 104 increases the amount of numerical value change with increasing amount of movement and decreases the amount of numerical value change with decreasing amount of movement.

Figure 6:
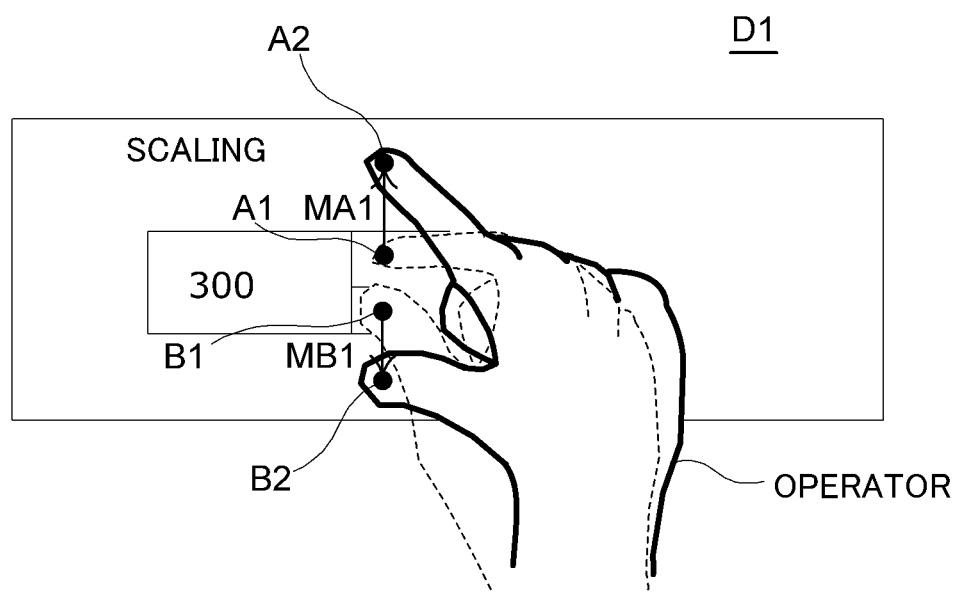
FIG. 6 is a view showing how the operator slides his/her thumb and index finger with a multi-touch gesture on the display screen.

Specifically, when as shown in FIG. 6 the operator performs a multi-touch gesture and the first movement information detecting section 102 detects the amount of movement MA1 of the index finger from the initial point A1 to the primary stopping point A2, the amount-of-value-change calculating section 104 calculates an amount of numerical value change associated with the amount of movement MA1.

For example, if as shown in FIG. 7A the amount of movement MA1 of the index finger slid from the initial point A1 by the operator is small (for example, one-tenth of an after-mentioned amount of movement MA110), the amount-of-value-change calculating section 104 calculates an amount of numerical value change so that the control section 100 can switch the numerical display from one to another of numerical values in increments of 1, like 0→1→2→3→ . . . →998→999→1000.

Alternatively, as shown in FIG. 7B, at an amount of movement MA102 greater than the amount of movement MA1 (for example, twice the amount of movement MA1), the amount-of-value-change calculating section 104 calculates an amount of numerical value change so that the control section 100 can switch the numerical display from one to another of the numerical values in increments of 2, like 0→2→4→6→ . . . →996→998→1000.

Still alternatively, as shown in FIG. 7C, at an amount of movement MA110 much greater than the amount of movement MA1 (for example, ten times the amount of movement MA1), the amount-of-value-change calculating section 104 calculates an amount of numerical value change so that the control section 100 can switch the numerical display from one to another of the numerical values in increments of 10, like 0→10→20→30→ . . . →980→990→1000. For simplicity, in FIG. 7C, the magnitude of the amount of movement MA110 is shown smaller than in reality.

Thus, by adjusting the amount of sliding movement MA1 of the index finger when the operator performs a multi-touch gesture by touching the display screen of the display section 14 with the thumb and index finger, the amount (width) of numerical value change in switching the numerical display in the scaling factor setting image display region d1 from a numerical value being currently displayed to the next numerical value to be displayed can be set at a desired value.

If NO in S4, this means that the amount of movement from the first initial point A1 to the primary stopping point is zero. In this case, the amount-of-value-change calculating section 104 calculates, as an amount of numerical value change corresponding to an amount of movement of zero, the amount of numerical value change being set at the time of detection of the amount of movement MA1. If NO in S4, the process proceeds to S8.

Then, the second movement information detecting section 103 determines whether or not the coordinate points corresponding to the touch points of the thumb indicated by the detection signals acquired from the touch panel 141 are coordinate points continuous (connected in series) from the second initial point (S8). If NO in S8, the process proceeds to S12.

So long as it is successively determined that the coordinate points corresponding to the touch points indicated by the detection signals are such continuous coordinate points as described above (YES in S8), the second movement information detecting section 103 continues to determine whether or not the receipt of detection signals indicating the above continuous coordinate points is continued (NO in S9).

When the receipt of detection signals indicating the above continuous coordinate points is terminated, for example, if the second movement information detecting section 103 determines that the detection of touch points indicating the above coordinate points continuous from the second initial point has finished (YES in S9), responding that the operator has stopped the sliding of his/her thumb from the second initial point, the second movement information detecting section 103 detects the amount of movement from the second initial point to a primary stopping point which is the last touch point where the sliding has been stopped, based on the coordinate points corresponding to the second initial point and primary stopping point indicated by the detection signals (S10).

Subsequently, the switching speed calculating section 105 calculates, according to the amount of movement MB1 of the thumb detected in S10, a switching speed at each display switch made so that the control section 100 allows the display section 14 to switch the numerical display from one to another of the numerical values in succession in the calculated amount of numerical value change (S11). The switching speed calculating section 105 previously stores, for example, various amounts of movement and their associated switching speeds in a correspondence relation in the form of a data table. The switching speed calculating section 105 calculates the switching speed by reading this value associated with the detected amount of movement from the data table. Alternatively, the switching speed calculating section 105 may previously store respective factors associated with the various amounts of movement and calculate the switching speed using the factor associated with the detected amount of movement.

Figure 8A:
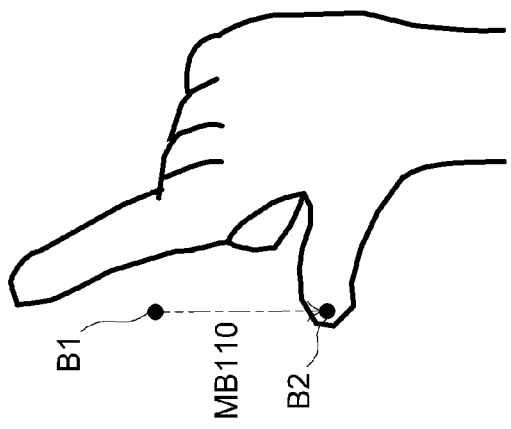
FIGS. 8A, 8B, and 8C are views showing states where an operator's thumb is slid in different amounts of sliding movement.

For example, as shown in FIG. 8A, when the amount of movement MB1 of the thumb slid from the second initial point B1 to the primary stopping point by the operator is detected, the switching speed calculating section 105 calculates a display switching speed associated with the amount of movement MB1. Specifically, if the amount of movement MB1 of the thumb slid from the second initial point B1 by the operator is small (for example, one-tenth of an aftermentioned amount of movement MB110), the switching speed calculating section 105 calculates a switching speed so that the control section 100 can switch the numerical display every n seconds.

Figure 8B:
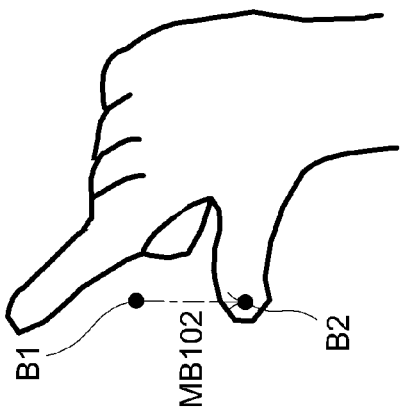

Alternatively, as shown in FIG. 8B, at an amount of movement MB102 greater than the amount of movement MB1 (for example, twice the amount of movement MB1), the switching speed calculating section 105 calculates a switching speed so that the control section 100 can switch the numerical display every 2n seconds.

Figure 8C:
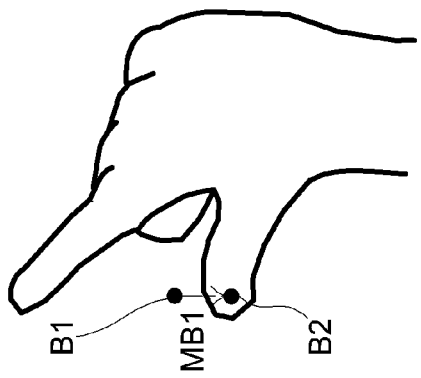

Still alternatively, as shown in FIG. 8C, at an amount of movement MB110 much greater than the amount of movement MB1 (for example, ten times the amount of movement MB1), the switching speed calculating section 105 calculates a switching speed so that the control section 100 can switch the numerical display every 10n seconds. For simplicity, in FIG. 8C, the magnitude of the amount of movement MB110 is shown smaller than in reality.

If NO in S8, this means that the amount of movement from the second initial point B1 to the primary stopping point is zero. In this case, the switching speed calculating section 105 calculates, as a switching speed corresponding to an amount of movement of zero, the switching speed being set at the time of detection of the amount of movement MB1.

Thus, by adjusting the amount of sliding movement MB1 of the thumb when the operator performs a multi-touch gesture by touching the display screen of the display section 14 with the thumb and index finger, the speed (period) for switching the numerical display in the scaling factor setting image display region d1 from the numerical value being displayed to the next numerical value to be displayed can be set at a desired value.

Figure 5:
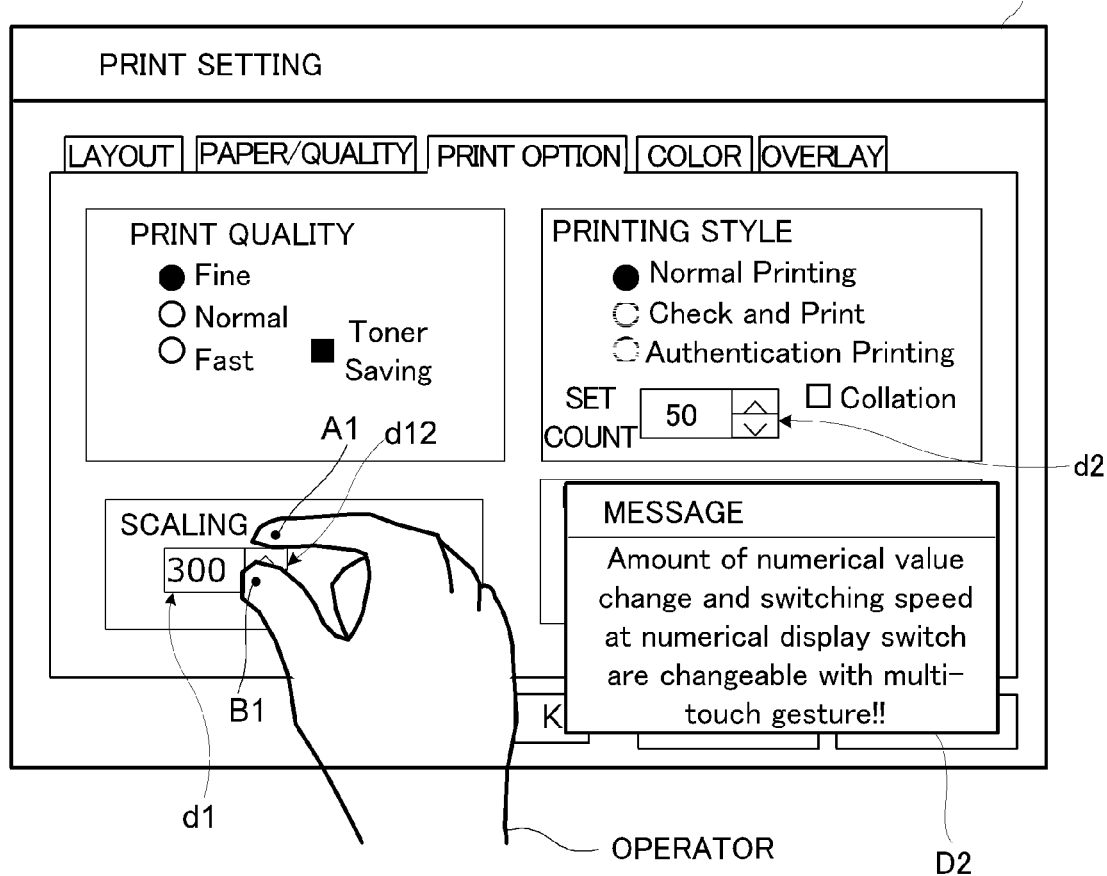
FIG. 5 is a view showing a state where an operator touches a scaling factor setting image display region with his/her finger.

The process up to this point will be described below in association with the operations of the operator. For example, when, as shown in FIG. 5, the operator touches, with his/her thumb and index finger, the scaling factor setting image display region d1 of the print setting screen D1 displayed on the display section 14, the first movement information detecting section 102 stores the touch point of the index finger as a first initial point A1 and the second movement information detecting section 103 stores the touch point of the thumb as a second initial point B1.

Subsequently, when, as shown in FIG. 6, the operator slides his/her index finger from the first initial point A1, for example, upward in FIG. 6, followed by stopping of the sliding movement of the index finger at a certain point A2, and slides his/her thumb from the second initial point B1, for example, downward in FIG. 6, followed by stopping of the sliding movement of the thumb at a certain point S2, the first movement information detecting section 102 stores a coordinate point corresponding to the point A2 as a primary stopping point A2 and calculates the amount of movement MA1 from the first initial point A1 to the primary stopping point A2. In addition, the second movement information detecting section 103 stores a coordinate point corresponding to the point B2 as a primary stopping point B2 and calculates the amount of movement MB1 from the second initial point B1 to the primary stopping point B2. Furthermore, the amount-of-value-change calculating section 104 calculates an amount of numerical value change based on the amount of movement MA1 and the switching speed calculating section 105 calculates a switching speed of numerical values based on the amount of movement MB1.

Referring back to FIG. 2, thereafter, when the touch panel 141 detects an operator's touch of a pull-up/pull-down key image d12 of the scaling factor setting image display region d1, the control section 100 allows the display section 14 to switch the display from one to another of a plurality of numerical values as display objects in succession using the amount of numerical value change calculated by the amount-of-value-change calculating section 104 in S7 and the switching speed calculated by the switching speed calculating section 105 in S11 (S12).

Thus, the operator can adjust both the amount of numerical value change and the switching speed of numerical values to be switchably displayed as candidates for a setting value on the display section 14, by a simple operation of sliding his/her thumb and index finger in two different directions on the display screen of the display section 14 using a multi-touch gesture to adjust the amounts of sliding movements of the thumb and index finger from their initial points.

The operator can easily make, with a multi-touch gesture on the display screen, adjustments such as increasing the switching speed to quickly reach the display of a desired numerical value when numerical values are displayed one after another in increments of 1 or decreasing the switching speed to make transition of numerical values displayed more visible when the numerical values are displayed one after another in increments of 10.

Since the operator can change, with movements of his/her fingers in a multi-touch gesture, both the amount of numerical value change and the switching speed when numerical values are displayed one after another, the setting change of the amount of numerical value change and the switching speed can be made more efficiently than when it is made by running a special program as is conventionally done.

This embodiment includes the case (1) where the operator substantially concurrently slides his/her thumb and index finger on the display screen of the display section 14 and the case (2) where the operator touches the display screen of the display section 14 with his/her thumb and index finger, slides one of the two fingers thereon, stops the sliding movement of the one finger, and then slides the other finger thereon.

When the operator substantially concurrently slides his/her thumb and index finger, the pieces of processing in S4 to S7 are performed in parallel with the pieces of processing in S8 to S11. When the operator slides his/her thumb first, the pieces of processing in S8 to S11 are performed first. In these manners, the first movement information detecting section 102 and the second movement information detecting section 103 can detect the amounts of movement resulting from the sliding movements of the operator's thumb and index finger using a multi-touch gesture.

For example, in a general display apparatus, in order to increase the operator's visibility and operability when its display section switches the display from one to another of numerical values indicating candidates for a setting value in succession, it is preferred that the operator could change, as appropriate, the amount (width) of numerical value change at the display switch and could also change, as appropriate, the speed at the display switch. Furthermore, the operation in changing the amount of numerical value change and the switching speed should preferably be easy for the operator.

With these points in mind, this embodiment is configured so that the amount of numerical value change and the display switching speed of numerical values to be displayed one after another, on the display section, as candidates for a setting value for a function operable on the apparatus can be changed with a simple operation of the operator.

Figure 9:
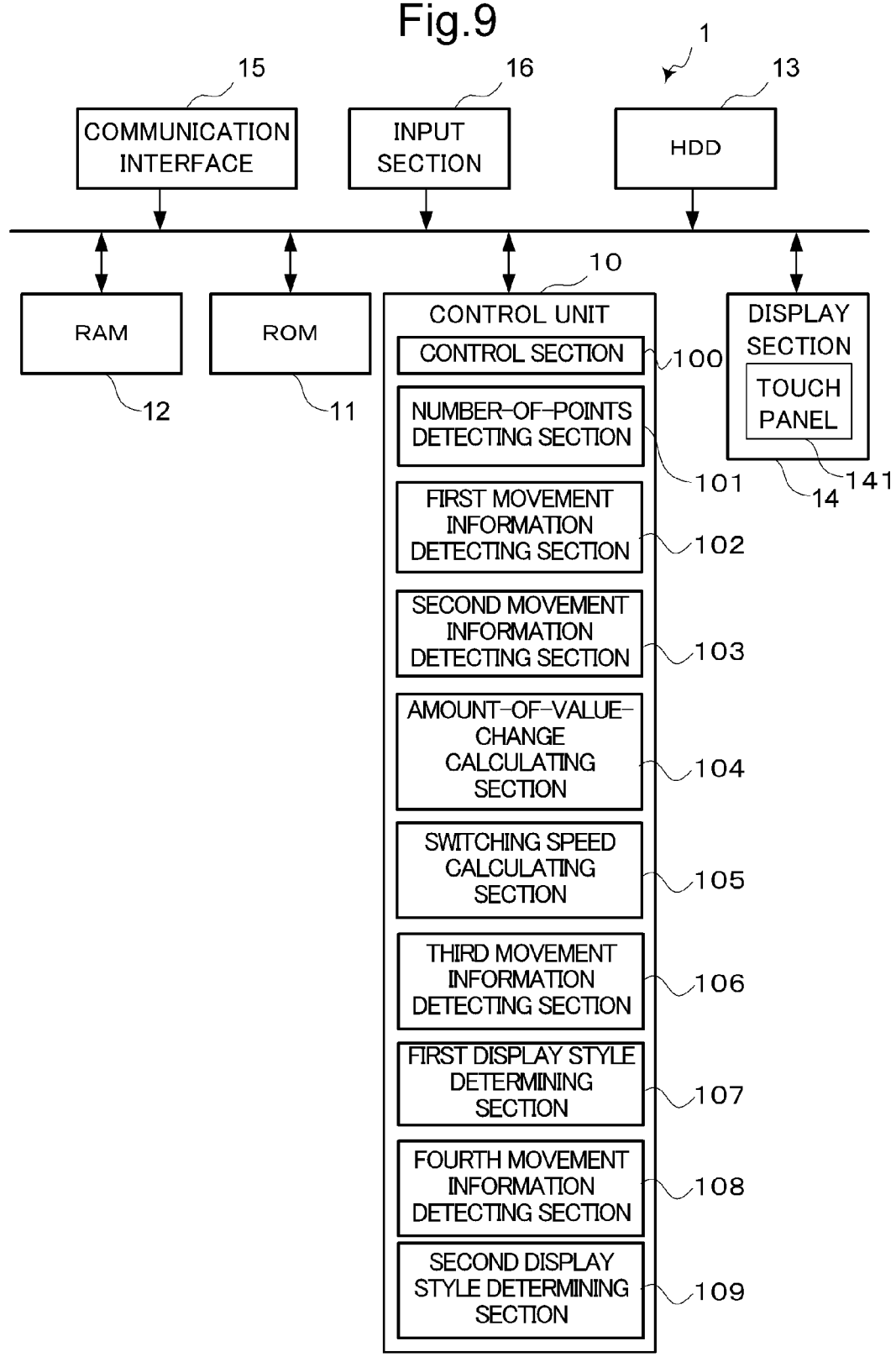
FIG. 9 is a block diagram schematically showing an internal architecture of an information processing apparatus serving as a display apparatus according to a second embodiment of the present disclosure.

Next, a description will be given of an information processing apparatus 1 according to a second embodiment. FIG. 9 is a block diagram schematically showing an internal architecture of the information processing apparatus 1 serving as a display apparatus according to a second embodiment of the present disclosure. Further description of the same configurations as in the first embodiment described with reference to FIG. 1 will be omitted.

The control unit 10 of the information processing apparatus 1 according to the second embodiment further includes a third movement information detecting section 106, a first display style determining section 107, a fourth movement information detecting section 108, and a second display style determining section 109.

The third movement information detecting section 106 is configured, when touch points forming coordinate points continuous from a primary stopping point detected by the first movement information detecting section 102 are successively detected in a predetermined direction by the touch panel 141 and the successive detection of the touch points is then stopped again, to detect an amount of movement from the primary stopping point to a secondary stopping point where the successive detection is stopped again.

In the second embodiment, the first movement information detecting section 102 detects, based on coordinate points corresponding to the initial point and primary stopping point indicated by the detection signals from the touch panel 141, not only the amount but also the direction of movement from the initial point to the primary stopping point. The predetermined direction is, for example, a direction orthogonal to the direction of movement from the initial point toward the primary stopping point. However, the predetermined direction is not limited to the above direction but may be any other direction.

The first display style determining section 107 is configured to determine a first display style of numerical values to be displayed on the display section 14 according to the amount of movement detected by the third movement information detecting section 106. In this embodiment, the first display style determining section 107 determines as the first display style the display color of numerical values to be displayed. The first display style determining section 107 previously stores, for example, various amounts of movement and their associated display colors in a correspondence relation in the form of a data table. The first display style determining section 107 calculates the display color corresponding to the amount of movement by reading this display color associated with the detected amount of movement from the data table.

The display color for use as the display style determined by the first display style determining section 107 may be the font color of characters representing numerical values and may be the background color of the region where the numerical values are to be displayed. The following description takes as an example the case where the display style is the font color.

The first display style determining section 107 calculates the display color in proportion to a change in the amount of movement detected by the third movement information detecting section 106. Specifically, the first display style determining section 107 makes the display color lighter, for example, warmer, with increasing amount of movement and makes the display color darker, for example, colder or more blackish with decreasing amount of movement.

The fourth movement information detecting section 108 is configured, when touch points forming coordinate points continuous from a primary stopping point detected by the second movement information detecting section 103 are successively detected in a predetermined direction by the touch panel 141 and the successive detection of the touch points is then stopped again, to detect an amount of movement from the primary stopping point to a secondary stopping point where the successive detection is stopped again.

In the second embodiment, the second movement information detecting section 103 detects, based on coordinate points indicated by the detection signals from the touch panel 141, not only the amount but also the direction of movement from the initial point to the primary stopping point. The predetermined direction is, for example, a direction orthogonal to the direction of movement from the initial point toward the primary stopping point. However, the predetermined direction is not limited to the above direction but may be any other direction.

The second display style determining section 109 is configured to determine a second display style of numerical values to be displayed on the display section 14 according to the amount of movement detected by the fourth movement information detecting section 108. In this embodiment, the second display style determining section 109 determines as the second display style the font size of numerical values to be displayed. The second display style determining section 109 previously stores, for example, various amounts of movement and their associated font sizes in a correspondence relation in the form of a data table. The second display style determining section 109 calculates the font size corresponding to the amount of movement by reading this font size associated with the detected amount of movement from the data table. Alternatively, the second display style determining section 109 may previously store respective factors associated with the various amounts of movement and calculate the font size using the factor associated with the detected amount of movement.

The second display style determining section 109 calculates the font size in proportion to a change in the amount of movement detected by the fourth movement information detecting section 108. Specifically, the second display style determining section 108 increases the font size with increasing amount of movement and decreases the font size with decreasing amount of movement.

The control section 100 allows the display section 14 to switch the display from one to another of numerical values in succession in the calculated amount of numerical value change using the display color or so on as the first display style determined by the first display style determining section 107 and the font size or so on as the second display style determined by the second display style determining section 109 and uses the calculated switching speed as the switching speed at the display switch from one numerical value to another.

Figure 10:
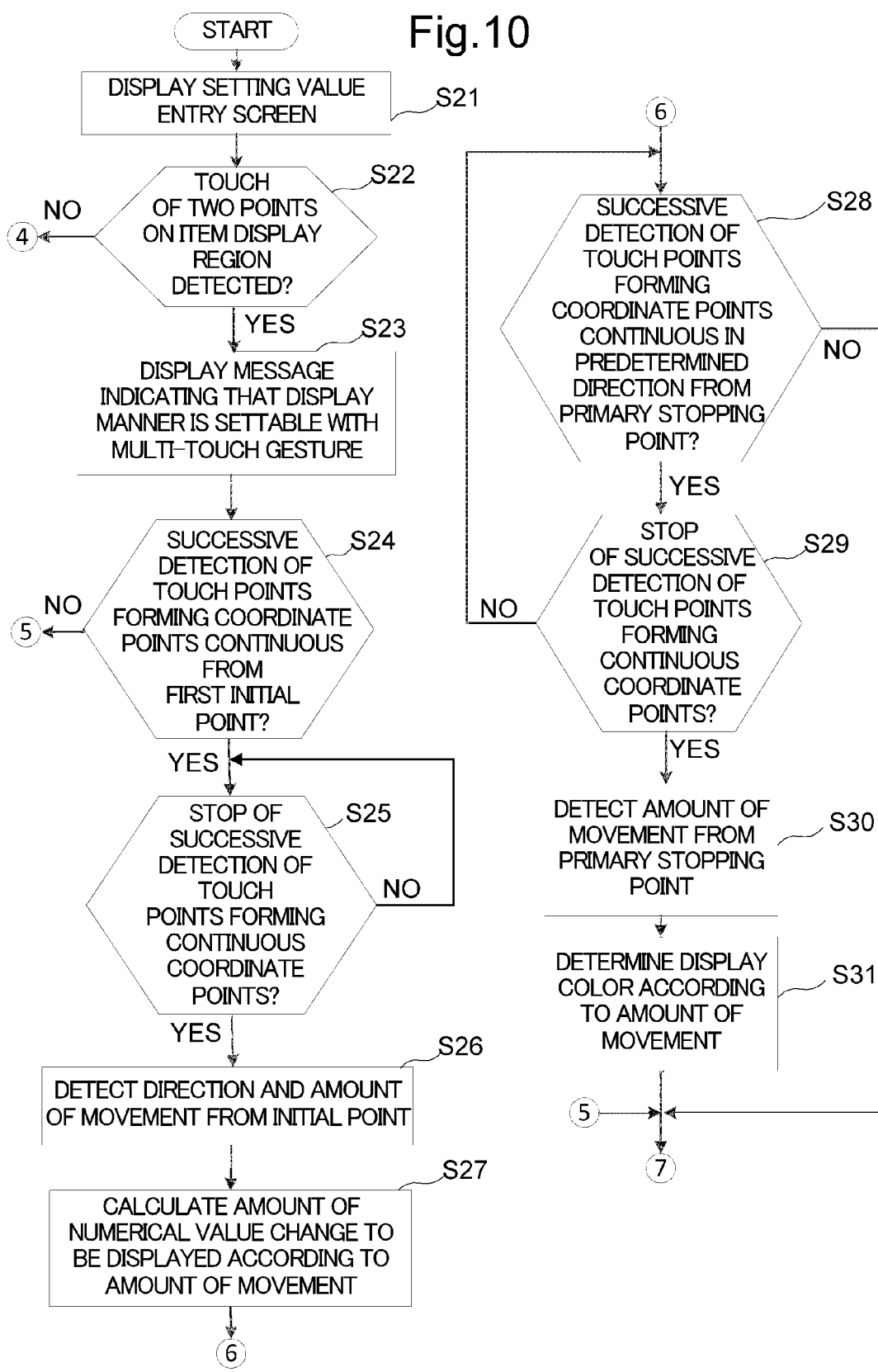
FIG. 10 is a first half of a flowchart showing a second embodiment of display control in the information processing apparatus.
Figure 11:
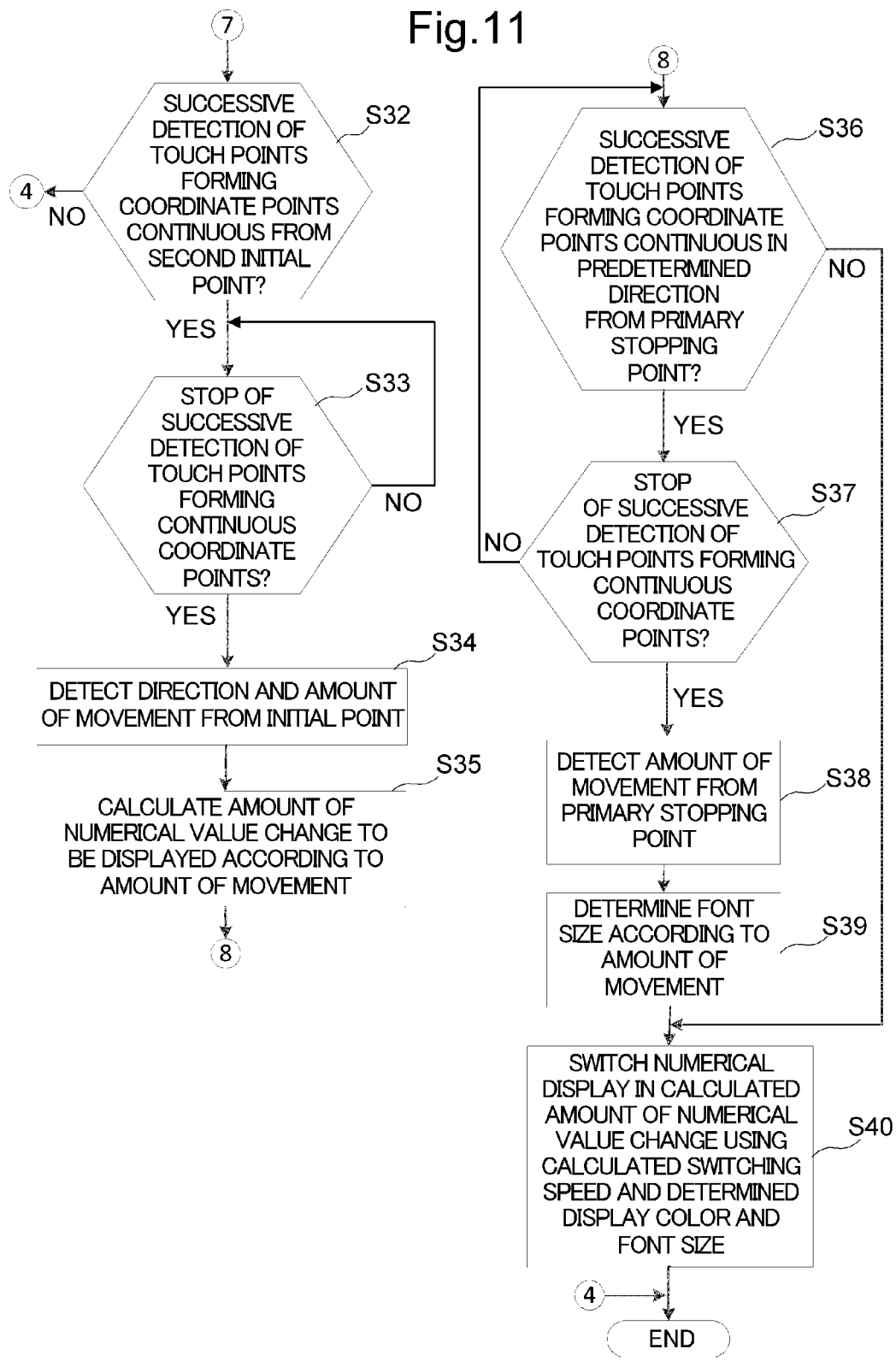
FIG. 11 is a second half of the flowchart showing the second embodiment of display control in the information processing apparatus.

Next, a description will be given of display control in the information processing apparatus 1 according to the second embodiment. FIGS. 10 and 11 show a flowchart illustrating display control in the information processing apparatus 1 according to the second embodiment. Further description of the same pieces of processing as those in the first embodiment shown in FIG. 2 will be omitted.

In the second embodiment, the operator slides one of the two fingers touching the display screen in a direction and then further slides the one finger in a second direction and, according to the amount of sliding movement in the second direction, the display style of numerical values as display objects, for example, the color or size, can be set.

In the second embodiment, after, like the first embodiment shown in FIG. 2, the first movement information detecting section 102 detects the direction and amount of movement of an operator's finger, for example, his/her index finger, from the first initial point to the primary stopping point and the amount of numerical value change associated with the detected amount of movement is calculated (S21 to S27), the third movement information detecting section 106 determines whether or not the coordinate points corresponding to touch points indicated by detection signals acquired from the touch panel 141 are coordinate points continuous in the predetermined direction from the primary stopping point (S28).

So long as it is successively determined that the coordinate points corresponding to the touch points indicated by the detection signals are coordinate points continuous from the primary stopping point (YES in S28), the third movement information detecting section 106 continues to determine whether or not the receipt of detection signals indicating the above continuous coordinate points is continued (NO in S29, S28). If NO in S28, the process proceeds to S32.

When the receipt of detection signals indicating the above continuous coordinate points is terminated, i.e., if the third movement information detecting section 106 determines that the detection of touch points indicating the above coordinate points continuous from the primary stopping point has finished (YES in S29), responding that the operator has stopped the sliding of his/her index finger in the predetermined direction from the primary stopping point, the third movement information detecting section 106 detects the amount of movement from the primary stopping point to a secondary stopping point which is the last touch point where the sliding has been stopped, based on the coordinate points corresponding to the primary and secondary stopping points indicated by the detection signals (S30).

Figure 12:
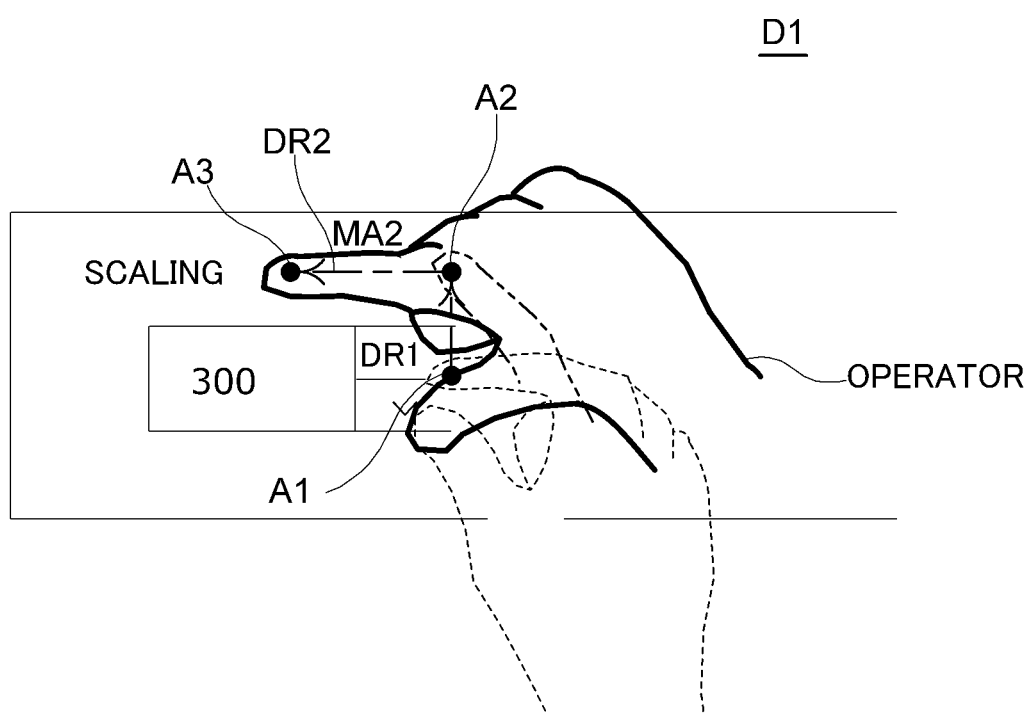
FIG. 12 is a view showing an example of a sliding movement of the index finger in a predetermined direction from a primary stopping point.

This process will be described below in association with the operations of the operator. For example, as shown in FIG. 12, the operator slides his/her index finger from the primary stopping point A2 in the predetermined direction, for example, in a direction DR2 orthogonal to the direction of movement DR1, and stops the sliding movement at a certain point A3, the third movement information detecting section 106 stores a coordinate point corresponding to the point A3 as a secondary stopping point A3 and calculates the amount of movement MA2 from the primary stopping point A2 to the secondary stopping point A3.

Subsequently, the first display style determining section 107 determines, according to the amount of movement MA2 detected in S30, a display color at each display switch made so that the control section 100 allows the display section 14 to switch the numerical display from one to another of the numerical values in succession in the calculated amount of numerical value change (S31).

Figure 13A:
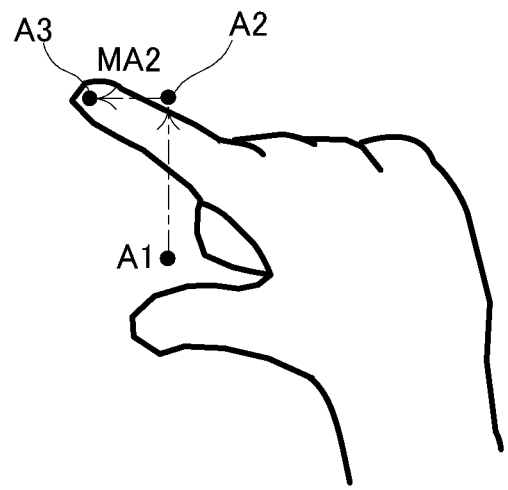
FIGS. 13A, 13B, and 13C are views showing different sliding movements and different amounts of sliding movement of the index finger from the primary stopping point to various secondary stopping points.

When, as has been described with reference to FIG. 12, the third movement information detecting section 106 detects the amount of movement MA2 from the primary stopping point A2 to the secondary stopping point A3, the first display style determining section 107 determines the display color corresponding to the amount of movement MA2 to be, for example, blue. For example, if as shown in FIG. 13A the amount of movement MA2 of the index finger slid from the primary stopping point A2 by the operator is small (for example, one-tenth of an after-mentioned amount of movement MA210), the first display style determining section 107 determines the display color so that the control section 100 allows the display of numerical values in blue.

Figure 13B:
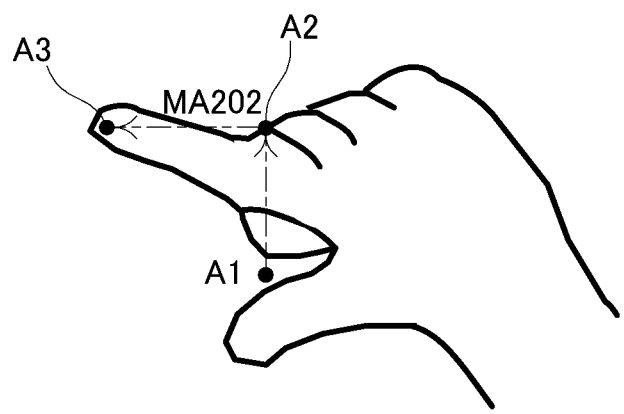

Alternatively, as shown in FIG. 13B, at an amount of movement MA202 greater than the amount of movement MA2 (for example, twice the amount of movement MA2), the first display style determining section 107 determines the display color so that the control section 100 can switch the numerical display with the numerical values in green.

Figure 13C:
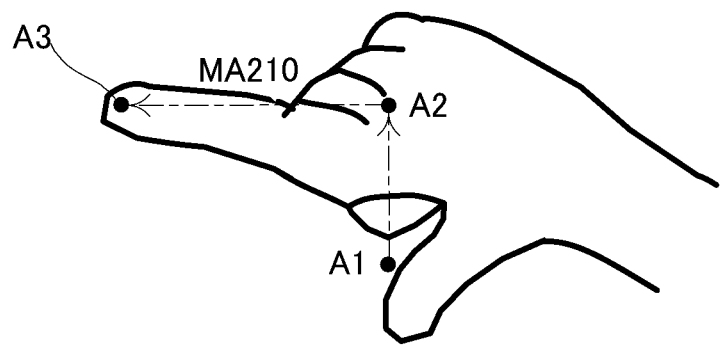

Still alternatively, as shown in FIG. 13C, at an amount of movement MA210 much greater than the amount of movement MA2 (for example, ten times the amount of movement MA2), the first display style determining section 107 determines the display color so that the control section 100 can switch the numerical display with the numerical values in red. For simplicity, in FIG. 13C, the magnitude of the amount of movement MA210 is shown smaller than in reality.

Thus, by adjusting the amount of sliding movement MA2 when the operator slides his/her index finger on the display screen of the display section 14 in the predetermined direction from the primary stopping point A2, the display color of numerical values to be displayed one after another in the scaling factor setting image display region d1 can be set at a desired color.

Furthermore, after the second movement information detecting section 103 detects the direction and amount of movement of an operator's finger, for example, his/her thumb, from the first initial point to the primary stopping point (S32 to S34) and the switching speed of numerical values associated with the detected amount of movement is calculated (S35), the fourth movement information detecting section 108 determines whether or not the coordinate points corresponding to touch points indicated by detection signals acquired from the touch panel 141 are coordinate points continuous in the predetermined direction from the primary stopping point (S36).

So long as it is successively determined that the coordinate points corresponding to the touch points indicated by the detection signals are coordinate points continuous from the primary stopping point (YES in S36), the fourth movement information detecting section 108 continues to determine whether or not the receipt of detection signals indicating the above continuous coordinate points is continued (NO in S37, S36). If NO in S36, the process proceeds to S40.

When the receipt of detection signals indicating the above continuous coordinate points is terminated, i.e., if the fourth movement information detecting section 108 determines that the detection of touch points indicating the above coordinate points continuous from the primary stopping point has finished (YES in S37), responding that the operator has stopped the sliding of his/her thumb in the predetermined direction from the primary stopping point, the fourth movement information detecting section 108 detects the amount of movement from the primary stopping point to a secondary stopping point which is the last touch point where the sliding has been stopped, based on the coordinate points corresponding to the primary and secondary stopping points indicated by the detection signals (S38).

Figure 14:
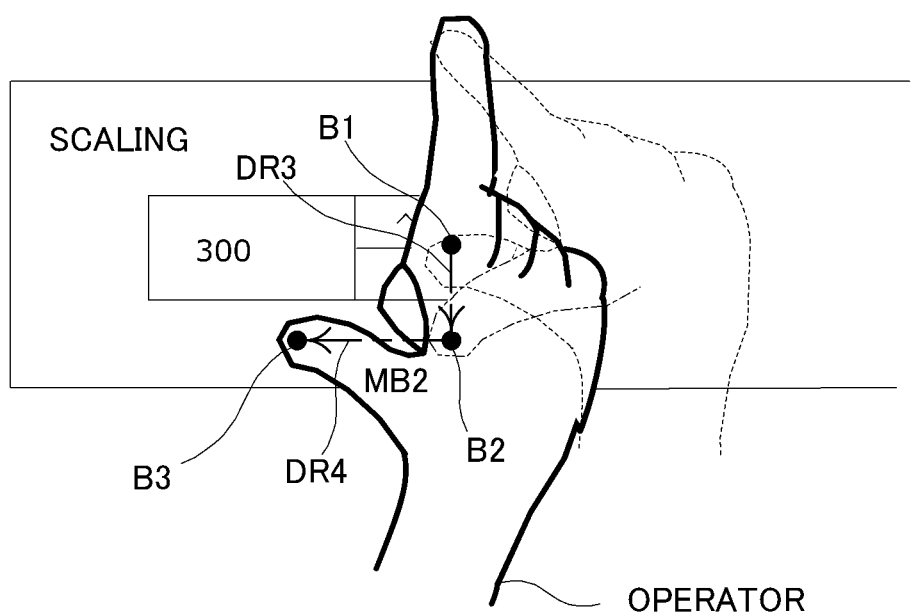
FIG. 14 is a view showing an example of a sliding movement of the thumb in a predetermined direction from a primary stopping point.

This process will be described below in association with the operations of the operator. For example, as shown in FIG. 14, the operator slides his/her thumb from the primary stopping point B2 in the predetermined direction, for example, in a direction DR4 orthogonal to the direction of movement DR3, and stops the sliding movement at a certain point B3, the fourth movement information detecting section 108 stores a coordinate point corresponding to the point B3 as a secondary stopping point B3 and calculates the amount of movement MB2 from the primary stopping point B2 to the secondary stopping point B3.

Subsequently, the second display style determining section 109 determines, according to the amount of movement MB2 detected in S38, a font size at each display switch made so that the control section 100 allows the display section 14 to switch the numerical display from one to another of the numerical values in succession in the calculated amount of numerical value change (S39).

Figure 15A:
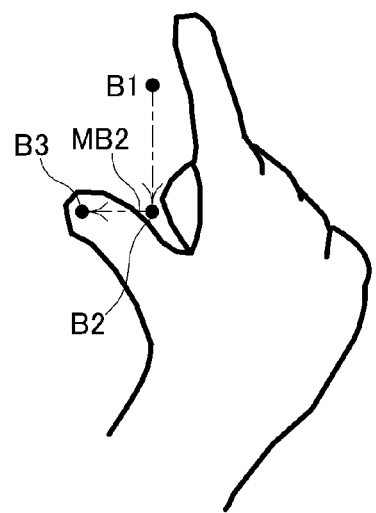
FIGS. 15A, 15B, and 15C are views showing different sliding movements and different amounts of sliding movement of the thumb from the primary stopping point to various secondary stopping points.

For example, if as shown in FIG. 15A, the amount of movement MB2 of the thumb slid from the primary stopping point B2 by the operator is small (for example, one-tenth of an after-mentioned amount of movement MB210), the second display style determining section 109 determines the font size so that the control section 100 allows the display of numerical values in 5 points.

Figure 15B:
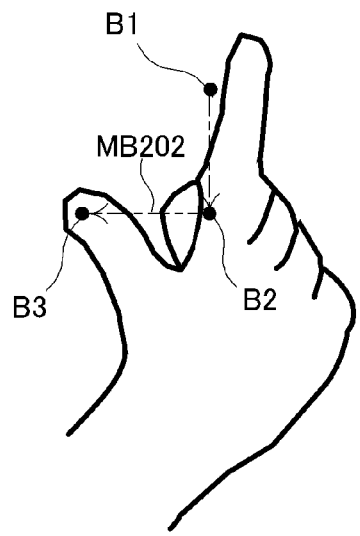

Alternatively, as shown in FIG. 15B, at an amount of movement MB202 greater than the amount of movement MB2 (for example, twice the amount of movement MB2), the second display style determining section 109 determines the font size so that the control section 100 can switch the numerical display with the numerical values in 10 points.

Figure 15C:
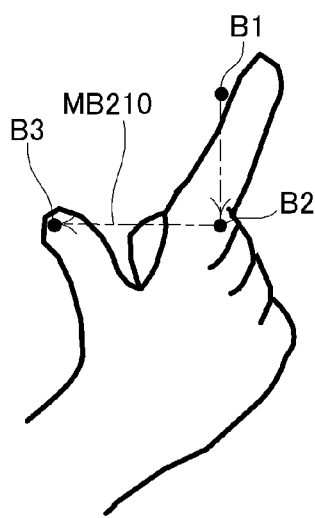

Still alternatively, as shown in FIG. 15C, at an amount of movement MB210 much greater than the amount of movement MB2 (for example, five times the amount of movement MB2), the second display style determining section 109 determines the font size so that the control section 100 can switch the numerical display with the numerical values in 25 points. For simplicity, in FIG. 15C, the magnitude of the amount of movement MB210 is shown smaller than in reality.

Thus, by adjusting the amount of sliding movement MB2 when the operator slides his/her thumb on the display screen of the display section 14 in the predetermined direction from the primary stopping point B2, the font size of numerical values to be displayed one after another in the scaling factor setting image display region d1 can be set at a desired size.

The sliding movement of the finger to be detected by the third movement information detecting section 106 and the sliding movement of the finger to be detected by the fourth movement information detecting section 108 may be performed substantially concurrently. Furthermore, the detections of the amount of movements by the third and fourth movement information detecting sections 106, 108 may also be performed substantially concurrently. The determinations of the display styles by the first and second display style determining sections 107, 109 may also be performed substantially concurrently.

Thereafter, when the touch panel 141 detects an operator's touch of the pull-up/pull-down key image d12 of the scaling factor setting image display region d1, the control section 100 allows the display section 14 to switch the display from one to another of a plurality of numerical values as display objects in succession using the amount of numerical value change calculated by the amount-of-value-change calculating section 104 in S27, the display color determined in S31, the switching speed calculated by the switching speed calculating section 105 in S35, and the font size determined in S39 (S40).

Thus, the operator can adjust both the amount of numerical value change and the display color of numerical values to be switchably displayed as candidates for a setting value on the display section 14, by a simple series of operations including touches of the display screen of the display section 14 with his/her two fingers and sliding movements of one of the two fingers in two directions on the display screen to adjust the amounts of sliding movements in these directions.

Furthermore, the operator can adjust both the switching speed and the font size of the numerical values by a simple series of operations of sliding the other of the two fingers in two directions on the display screen to adjust the amounts of sliding movements in these directions.

Moreover, the operator can easily select, with simple sliding gestures of his/her fingers on the display screen, the display styles, such as the display color and the font size, according to the amount of numerical value change and the switching speed.

Since the operator can change, with a seamless series of movements of his/her two fingers, the amount of numerical value change, the switching speed, the color, and the font size when numerical values are displayed one after another, the setting change of these display manners and styles can be made more efficiently than when it is made by running a special program as is conventionally done.

The present disclosure is not limited to the configurations of the above embodiments and can include various modifications. For example, as shown in FIG. 16, when like the second embodiment the first movement information detecting section 102 determines that a predetermined number of touch points indicating coordinate points continuous from a first initial point have been successively detected (YES in S54) and then determines that the successive detection of the touch points indicating coordinate points continuous from the initial point has been stopped (YES in S55), the third movement information detecting section 106 starts measuring the elapse of time from the time point at which the successive detection has been stopped, i.e., the time point of detection of a primary stopping point, for example, with an internal timer of the control unit 10 (S56). The first movement information detecting section 102 detects the direction and amount of movement from the first initial point (S57) and the amount-of-value-change calculating section 104 calculates an amount of numerical value change (S58).

Then, when touch points indicating coordinate points continuous from the primary stopping point have been detected (YES in S59), the third movement information detecting section 106 determines whether or not the elapsed time from the measurement start in S56 has reached a predetermined time (for example, two seconds, shown as "PREDETERMINED VALUE" in FIG. 16) (S60).

If the third movement information detecting section 106 determines that the elapsed time has reached the predetermined time (YES in S60), the third movement information detecting section 106 determines whether or not a predetermined number of touch points indicating coordinate points continuous from the primary stopping point have been successively detected in the same direction as the direction of movement detected by the first movement information detecting section 102 (i.e., as the direction of movement from the initial point toward the primary stopping point) (S61).

When the third movement information detecting section 106 determines that the predetermined number of touch points indicating coordinate points continuous from the primary stopping point have been successively detected (YES in S61) and then determines that the successive detection of touch points indicating coordinate points continuous from the primary stopping point has finished (YES in S62), the third movement information detecting section 106 detects the amount of movement from the primary stopping point to the secondary stopping point, based on the coordinate points corresponding to the primary and secondary stopping points indicated by the detection signals (S63). Thereafter, like the second embodiment, the first display style determining section 107 determines the display style (display color) according to the detected amount of movement to the secondary stopping point (S64).

The numbers encircled in FIG. 16 refers to connection to the pieces of processing indicated by the same numbers encircled in FIGS. 10 and 11.

On the other hand, if in S60 the third movement information detecting section 106 determines that the elapsed time has not reached the predetermined time (NO in S60), the same pieces of processing as those shown in FIGS. 10 and 11 are performed, that is, the first display style determining section 107 selects the display style according to the amount of movement from the primary stopping point so long as the coordinate points corresponding to touch points indicated by detection signals acquired from the touch panel 141 are coordinate points continuous in the aforementioned predetermined direction from the primary stopping point (S28 to S31 in FIG. 10).

For example, when the operator slides his/her index finger from an initial point, stops the slide at a primary stopping point, and, after the elapse of the aforementioned predetermined time, further slides the index finger, the third movement information detecting section 106 detects an amount of movement produced by the further slide from the primary stopping point in the same direction as the direction in which the operator's index finger has moved from the initial point to the primary stopping point and the first display style determining section 107 determines a display style (display color) associated with the detected amount of movement to the secondary stopping point.

Figure 17:
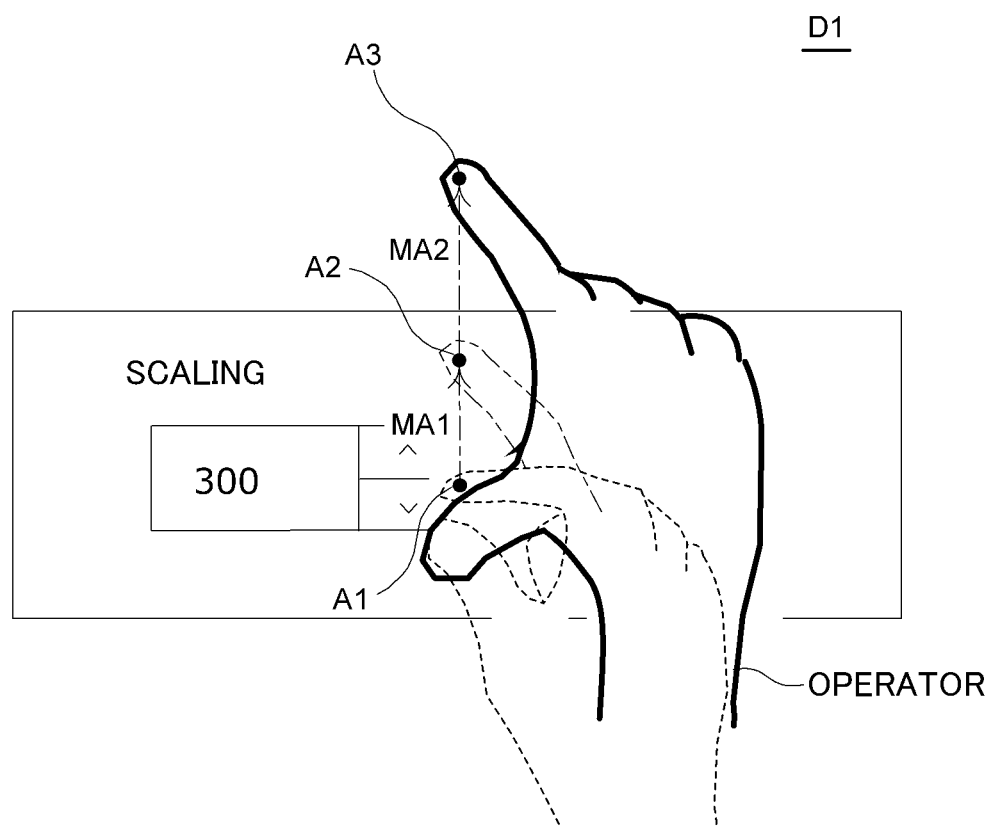
FIG. 17 is a view showing a state where an operator's finger is moved from a primary stopping point in the same direction as that toward the primary stopping point.

Therefore, as shown in FIG. 17, by sliding an operator's index finger from an initial point to a primary stopping point, stopping the index finger at the primary stopping point for the predetermined time, and then sliding the index finger again in the same direction as the sliding movement to the primary stopping point, the operator can adjust both the amount of movement MA1 for the calculation of the amount of numerical value change and the amount of movement MA2 for the calculation of the display color with just changes in the respective amounts of sliding movements and can set the amount of numerical value change and the display color as desired.

The detection of the amount of movement by the fourth movement information detecting section 108 and the determination of the display style by the second display style determining section 109, following the detection of the amount and direction of movement by the second movement information detecting section 103 and the calculation of the switching speed, are also performed in the same manner.

Although in the above embodiments the information processing apparatus 1 as typified by a personal computer has been described as one embodiment of the display apparatus according to the present disclosure, the present disclosure is not limited to this. Various types of equipment with a display section having a touch panel function, such as smartphones, mobile devices, and image forming apparatuses, can be applied as the display apparatus according to the present disclosure.

The configurations and processing shown in the above embodiments with reference to FIGS. 1 to 17 are merely illustrative of the present disclosure and the present disclosure is not intended to be limited to these configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display apparatus comprising:
a display section configured to display an image;
a display control section configured to control a display operation of the display section;
an operating point detecting section configured to detect an operating point where an operator has performed an operation on a display screen of the display section;
a number-of-points detecting section configured to detect whether or not two operating points has been substantially concurrently detected by the operating point detecting section;
a first movement information detecting section configured, when the two operating points are detected by the number-of-points detecting section, operating points forming coordinate points continuous from an initial point which is one of the two detected operating points are successively detected by the operating point detecting section, and the successive detection of the operating points is then stopped, to detect first movement information indicating an amount of movement from the initial point to a primary stopping point where the successive detection is stopped;
a second movement information detecting section configured, when the two operating points are detected by the number-of-points detecting section, operating points forming coordinate points continuous from an initial point which is the other of the two detected operating points are successively detected by the operating point detecting section, and the successive detection of the operating points is then stopped, to detect second movement information indicating an amount of movement from the initial point to a primary stopping point where the successive detection is stopped;
an amount-of-value-change calculating section configured to calculate, from the amount of movement detected by the first movement information detecting section, a predetermined increment used as an amount of numerical value change at each display switch so that the display control section allows the display section to switch a display from one to another of a plurality of numerical values in succession in increasing or decreasing order; and
a switching speed calculating section configured to calculate, from the amount of movement detected by the second movement information detecting section, a display period of each of the plurality of numerical values used as a switching speed at each display switch so that the display control section allows the display section to switch the display from one to another of the plurality of numerical values in succession in the amount of numerical value change,
wherein the display control section is further configured to allow the display section to switch the display from one to another of the plurality of numerical values in succession in the calculated amount of numerical value change and use the calculated switching speed as the switching speed at the display switch from one to another of the plurality of numerical values.

2. The display apparatus according to claim 1, wherein the amount-of-value-change calculating section is configured to calculate the amount of numerical value change to be greater as the amount of movement detected by the first movement information detecting section is greater.

3. The display apparatus according to claim 1, wherein the switching speed calculating section is configured to calculate the switching speed to be higher as the detected amount of movement is greater.

4. A display apparatus comprising:
a display section configured to display an image;
a display control section configured to control a display operation of the display section;
an operating point detecting section configured to detect an operating point where an operator has performed an operation on a display screen of the display section;
a number-of-points detecting section configured to detect whether or not two operating points has been substantially concurrently detected by the operating point detecting section;
a first movement information detecting section configured, when the two operating points are detected by the number-of-points detecting section, operating points forming coordinate points continuous from an initial point which is one of the two detected operating points are successively detected by the operating point detecting section, and the successive detection of the operating points is then stopped, to detect first movement information indicating an amount of movement from the initial point to a primary stopping point where the successive detection is stopped;
a second movement information detecting section configured, when the two operating points are detected by the number-of-points detecting section, operating points forming coordinate points continuous from an initial point which is the other of the two detected operating points are successively detected by the operating point detecting section, and the successive detection of the operating points is then stopped, to detect second movement information indicating an amount of movement from the initial point to a primary stopping point where the successive detection is stopped;
an amount-of-value-change calculating section configured to calculate, from the amount of movement detected by the first movement information detecting section, an amount of numerical value change at each display switch made so that the display control section allows the display section to switch a display from one to another of a plurality of numerical values in succession in increasing or decreasing order; and
a switching speed calculating section configured to calculate, from the amount of movement detected by the second movement information detecting section, a switching speed at each display switch made so that the display control section allows the display section to switch the display from one to another of the plurality of numerical values in succession in the amount of numerical value change,
wherein the display control section is further configured to allow the display section to switch the display from one to another of the plurality of numerical values in succession in the calculated amount of numerical value change and use the calculated switching speed as the switching speed at the display switch from one to another of the plurality of numerical values,
the first movement information detecting section is further configured to detect, together with the amount of movement, a direction of movement from the initial point to the primary stopping point,
the display apparatus further comprises:
a third movement information detecting section configured, when the operating points forming coordinate points continuous from the primary stopping point detected by the first movement information detecting section are successively detected in a predetermined direction by the operating point detecting section and the successive detection of the operating points is then stopped again, to detect an amount of movement from the primary stopping point to a secondary stopping point where the successive detection is stopped again; and a first display style determining section configured to determine a first display style of numerical values to be displayed on the display section according to the amount of movement detected by the third movement information detecting section, and the display control section is further configured to allow the display section to switch the display from one to another of the plurality of numerical values in succession in the calculated amount of numerical value change using the first display style determined by the first display style determining section and use the calculated switching speed as the switching speed at the display switch from one to another of the plurality of numerical values.

5. The display apparatus according to claim 4, wherein the second movement information detecting section is configured to detect, together with the amount of movement, a direction of movement from the initial point to the primary stopping point, the display apparatus further comprises:

a fourth movement information detecting section configured, when the operating points forming coordinate points continuous from the primary stopping point detected by the second movement information detecting section are successively detected in a predetermined direction by the operating point detecting section and the successive detection of the operating points is then stopped again, to detect an amount of movement from the primary stopping point to a secondary stopping point where the successive detection is stopped again; and a second display style determining section configured to determine a second display style of the numerical values to be displayed on the display section, the second display style being different from the first display style, according to the amount of movement detected by the fourth movement information detecting section, and the display control section is further configured to allow the display section to switch the display from one to another of the plurality of numerical values in succession in the calculated amount of numerical value change using the first and second display styles and use the calculated switching speed as the switching speed at the display switch from one to another of the plurality of numerical values.

6. The display apparatus according to claim 5, wherein the first display style determining section is configured to determine one of color and size as the first display style and the second display style determining section is configured to determine the other of the color and size as the second display style.

7. The display apparatus according to claim 4, wherein when the third movement information detecting section detects a movement of the operating point a predetermined time after the first movement information detecting section detects the primary stopping point, the third movement information detecting section takes as the predetermined direction the same direction as the direction of movement detected by the first movement information detecting section.

8. The display apparatus according to claim 5, wherein when the fourth movement information detecting section detects a movement of the operating point a predetermined time after the second movement information detecting section detects the primary stopping point, the fourth movement information detecting section takes as the predetermined direction the same direction as the direction of movement detected by the second movement information detecting section.

9. A computer-readable non-transitory recording medium with a display control program stored thereon, the display control program allows a computer to function as:

a display control section configured to control a display operation of a display section;

an operating point detecting section configured to detect an operating point where an operator has performed an operation on a display screen of the display section;

a number-of-points detecting section configured to detect whether or not two operating points has been substantially concurrently detected by the operating point detecting section;

a first movement information detecting section configured, when the two operating points are detected by the number-of-points detecting section, operating points forming coordinate points continuous from an initial point which is one of the two detected operating points are successively detected by the operating point detecting section, and the successive detection of the operating points is then stopped, to detect first movement information indicating an amount of movement from the initial point to a primary stopping point where the successive detection is stopped;

a second movement information detecting section configured, when the two operating points are detected by the number-of-points detecting section, operating points forming coordinate points continuous from an initial point which is the other of the two detected operating points are successively detected by the operating point detecting section, and the successive detection of the operating points is then stopped, to detect second movement information indicating an amount of movement from the initial point to a primary stopping point where the successive detection is stopped;

an amount-of-value-change calculating section configured to calculate, from the amount of movement detected by the first movement information detecting section, an amount of numerical value change at each display switch made so that the display control section allows the display section to switch a display from one to another of a plurality of numerical values in succession in increasing or decreasing order; and a switching speed calculating section configured to calculate, from the amount of movement detected by the second movement information detecting section, a switching speed at each display switch made so that the display control section allows the display section to switch the display from one to another of the plurality of numerical values in succession in the amount of numerical value change, wherein the display control program further allows the computer to function so that the display control section allows the display section to switch the display from one to another of the plurality of numerical values in succession in the calculated amount of numerical value change and use the calculated switching speed as the switching speed at the display switch from one to another of the plurality of numerical values, the display control program further allows the first movement information detecting section to detect, together with the amount of movement, a direction of movement from the initial point to the primary stopping point, and allows the computer to function as:

a third movement information detecting section configured, when the operating points forming coordinate points continuous from the primary stopping point detected by the first movement information detecting section are successively detected in a predetermined direction by the operating point detecting section and the successive detection of the operating points is then stopped again, to detect an amount of movement from the primary stopping point to a secondary stopping point where the successive detection is stopped again; and a first display style determining section configured to determine a first display style of numerical values to be displayed on the display section according to the amount of movement detected by the third movement information detecting section, wherein the display control program further allows the computer to function so that the display control section allows the display section to switch the display from one to another of the plurality of numerical values in succession in the calculated amount of numerical value change using the first display style determined by the first display style determining section and use the calculated switching speed as the switching speed at the display switch from one to another of the plurality of numerical values.

* * * * *